US006502091B1

(12) United States Patent
Chundi et al.

(10) Patent No.: US 6,502,091 B1
(45) Date of Patent: Dec. 31, 2002

(54) APPARATUS AND METHOD FOR DISCOVERING CONTEXT GROUPS AND DOCUMENT CATEGORIES BY MINING USAGE LOGS

(75) Inventors: Parvathi Chundi, Mountain View, CA (US); Umeshwar Dayal, Saratoga, CA (US); Meichun Hsu, Los Altos Hills, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/511,195

(22) Filed: Feb. 23, 2000

(51) Int. Cl.$^7$ .............................. G06F 17/30; G06F 7/00
(52) U.S. Cl. ................................. 707/3; 707/4; 707/5
(58) Field of Search ............................... 707/7–10, 100, 707/104.1; 704/9; 705/4, 5; 395/749

(56) References Cited

U.S. PATENT DOCUMENTS

| | | | |
|---|---|---|---|
| 5,600,574 A | | 2/1997 | Reitan .......................... 364/552 |
| 5,619,709 A | * | 4/1997 | Caid et al. ...................... 704/9 |
| 5,794,178 A | * | 8/1998 | Caid et al. ..................... 345/440 |
| 5,819,258 A | * | 10/1998 | Vaithyanathan et al. ........ 707/2 |
| 5,857,179 A | * | 1/1999 | Vaithyanathan et al. ........ 707/2 |
| 5,870,559 A | | 2/1999 | Leshem et al. ......... 395/200.54 |
| 5,875,285 A | | 2/1999 | Chang ........................... 395/62 |
| 5,884,305 A | * | 3/1999 | Kleinberg et al. .............. 707/1 |
| 5,920,859 A | * | 7/1999 | Li ................................ 707/10 |
| 5,930,803 A | | 7/1999 | Becker et al. ............... 707/104 |
| 5,933,818 A | | 8/1999 | Kasravi et al. ................ 706/12 |
| 5,970,464 A | * | 10/1999 | Apte et al. ....................... 705/4 |
| 5,974,572 A | * | 10/1999 | Weinberg et al. .............. 714/47 |
| 6,006,221 A | * | 12/1999 | Liddy et al. .................... 704/2 |
| 6,006,223 A | * | 12/1999 | Agrawal et al. ............. 707/102 |
| 6,029,176 A | * | 2/2000 | Cannon .................... 707/104.1 |
| 6,144,962 A | * | 11/2000 | Weinberg et al. ............. 707/10 |
| 6,212,494 B1 | * | 4/2001 | Boguraev ..................... 704/10 |
| 6,233,575 B1 | * | 5/2001 | Agrawal et al. ............... 706/12 |
| 6,237,006 B1 | * | 5/2001 | Weinberg et al. ....... 707/103 R |
| 6,286,005 B1 | * | 9/2001 | Cannon ....................... 707/100 |
| 6,308,172 B1 | * | 10/2001 | Agrawal et al. ............... 704/4 |

* cited by examiner

*Primary Examiner*—Greta Robinson
*Assistant Examiner*—Linh Black

(57) ABSTRACT

An apparatus is provided for relating user queries and documents. The apparatus includes a client, a server, and a database being mutually coupled to a communications pathway. The client is configured to enable a user to submit user queries to locate documents. The server has a data mining mechanism configured to receive the user queries and generate information retrieval sessions. The database stores data in the form of usage logs generated from the information retrieval sessions. The data mining mechanism includes a clustering algorithm operative to identify context groups and usage categories. The data mining mechanism is operative to identify query contexts associated with individual queries from the usage logs, partition the queries into context groups having similar contexts, and compute multiple context groups associated with specific query keywords from the usage logs. A method is provided for associating user queries and documents in accordance with the apparatus.

31 Claims, 4 Drawing Sheets

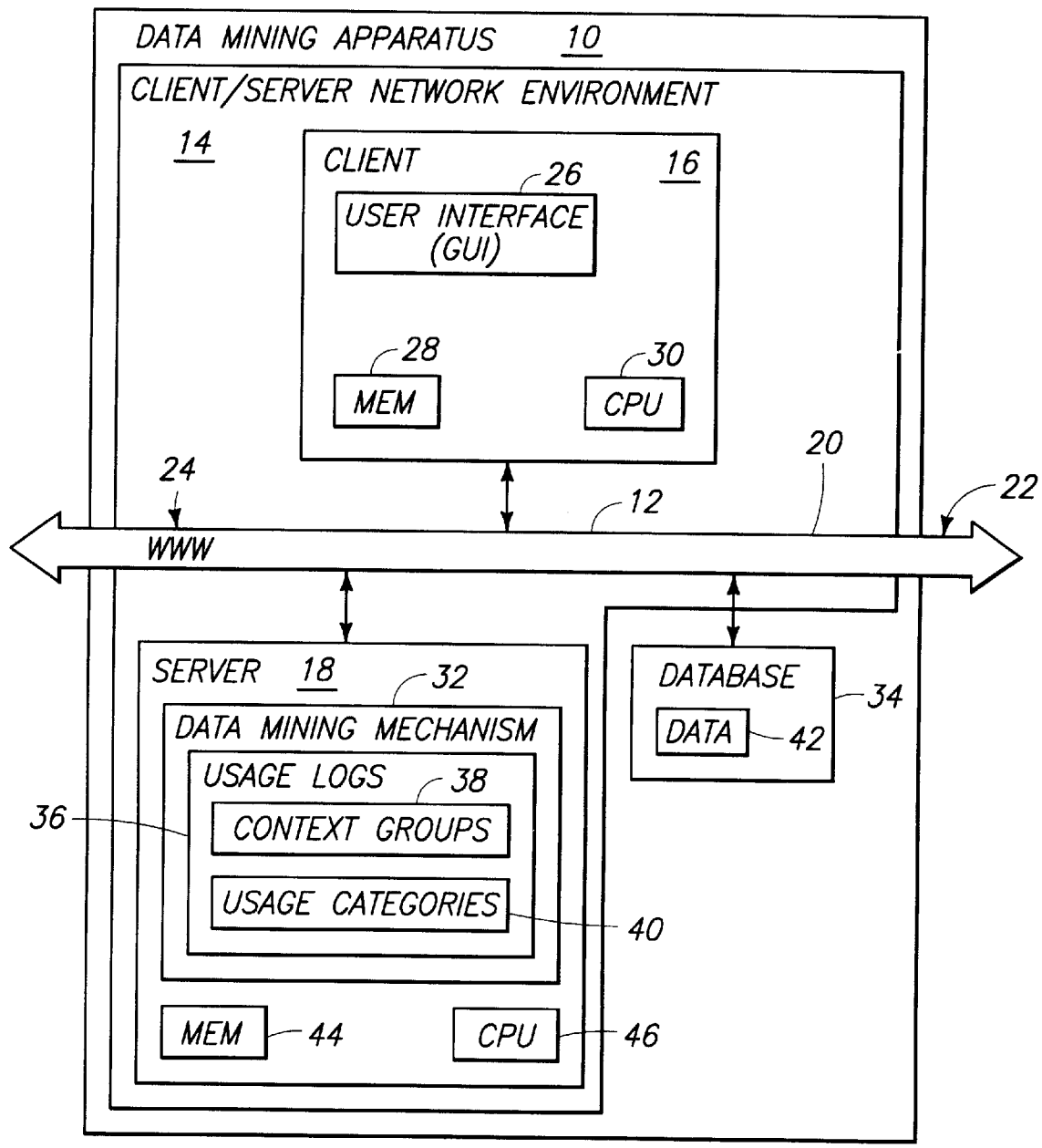

$$
\begin{array}{ccccc}
q_1 & n_1 & d_1 & d_2 & d_3 \\
q_2 & n_2 & d_1 & d_2 & d_4 \\
q_3 & n_3 & d_5 & d_6 & \\
\vdots & & \vdots & &
\end{array}
$$

*Fig. 2*

| Doc Id | Title |
|---|---|
| $d_1$ | What is PFS? |
| $d_2$ | How can I mount ISO 9669 CDs? |
| $d_3$ | Setting Up PFS on HP UX 10.20. |
| $d_4$ | Cannot mount Oracle CDROM using pfs_mount, error not owner |
| $d_5$ | pfs_mount command |
| $d_6$ | Several swinstall problems |
| $d_7$ | swinstall hangs at 10.20 |
| $d_8$ | Oracle hangs trying to reuse logs if started from service guard |

*Fig. 3*

| Session Id | Query | Opened document Id List |
|---|---|---|
| A | pfs | $d_1$ $d_3$ |
| B | cdrom | $d_2$ $d_3$ |
| C | pfs and mount and oracle | $d_4$ $d_5$ |
| D | swinstall and hang | $d_6$ $d_7$ |
| E | swinstall | $d_6$ |
| F | oracle and mount and fail | $d_8$ |

*Fig. 4*

| query context | Id | pfs | mount | cdrom | swinstall | hang | oracle | fail |
|---|---|---|---|---|---|---|---|---|
| $Q_1$ | | 0.5 | 0 | 0.5 | 0 | 0 | 0 | 0 |
| $Q_2$ | | 0.3 | 0.3 | 0 | 0 | 0 | 0.3 | 0 |
| $Q_3$ | | 0 | 0 | 0 | 0.6 | 0.3 | 0 | 0 |
| $Q_4$ | | 0 | 0.3 | 0 | 0 | 0 | 0.3 | 0.3 |

APPARATUS AND METHOD FOR DISCOVERING CONTEXT GROUPS AND DOCUMENT CATEGORIES BY MINING USAGE LOGS

FIELD OF THE INVENTION

This invention pertains to text retrieval systems. More particularly, this invention relates to data mining systems and methods for discovering context groups and document categories by mining usage logs.

BACKGROUND OF THE INVENTION

Text retrieval systems are concerned with locating documents relevant to a user's information needs from a collection of documents. The user describes their information needs using a query consisting of a number of words. Text retrieval systems compare the query with the documents in the collection and return the documents that are likely to satisfy the information needs. The intelligence of a text retrieval engine relates to the ability to determine how relevant a document is to a given query. Computation of the relevance largely depends on the words used and operators used in a given query. Generally, the chances of retrieving a document are high if queries contain words that occur in the documents the user wishes to retrieve. However, the words users use to describe concepts in their queries are often different than the words authors use to describe the same concepts in the documents. It has been found through experiments that two people use the same term to describe an object less than 20% of the time. The problem which results from this inconsistent word usage is referred to as a word mismatch problem. The problem is more severe for short queries than for long elaborate queries because as queries get longer, there is more chance that some important words will occur in both the query and the relevant documents.

The word mismatch problem is often solved by computing relationships between words in a given domain. In response to a query, the text retrieval system returns not only those documents that contain the words in the query, but also those documents that contain their related word as given by the word relationships. Word relationships are usually computed by some form of corpus analysis and by using domain knowledge. For example, stemming, a popular method to compute word relationships, reduces words to common roots. As a result, documents containing morphological variants of the query words are also included in the response. Another popular approach of computing word relationships is to use manual or automatically generated thesauri. Manual thesauri are built using human experience and expertise, and hence, are costly to build. Previously, corpus analysis has been used to generate a thesaurus automatically from the content of documents. Automatic construction of thesauri is based on a well-known hypothesis call the "association hypothesis" which states that related terms in the corpus tend to co-occur in documents. "Association hypothesis" can capture word relationships that are specific to the corpus. However, generating a thesaurus automatically from the entire corpus is very expensive if the corpus contains millions of documents. It is also hard to maintain if documents are frequently added to the corpus.

Recently, it has been shown that word relationships computed from the top n documents relevant to a query outperformed the thesaurus generated from the entire corpus. Relevance of a document to a given query is computed by the text retrieval system, solely based on the words that appear in the query and the document and may not conform to the user's opinion of relevance.

Capturing relationships between keywords by automatic thesaurus construction has previously been studied extensively. Some of the earliest work in automatic thesaurus construction was based on term clustering. According to this work, related terms are grouped into clusters based upon co-occurrence of the terms in the corpus. Terms that co-occur with one or more query terms are used in query expansion. Previously, it has been proposed that expansion terms must co-occur with all query terms in order to achieve higher retrieval effectiveness. Techniques have been proposed that do not require analyzing all documents in the corpus for computing the thesaurus. Expansion terms are obtained by co-occurrence analysis of all query terms in a query Q and other terms from top-ranked documents (or all documents) in the result of Q.

Therefore, there exists a need to improve the completeness of information that is mined and a need to address word mismatch problems incurred with prior art techniques based on historical information mined from usage logs. Usage logs record data about the queries submitted by users and the documents retrieved by users.

SUMMARY OF THE INVENTION

An apparatus and method are provided for discovering context groups and document categories by mining usage logs of users.

According to one aspect, an apparatus is provided for relating user queries and documents. The apparatus includes a client, a server, a communications pathway, and a database. The client is configured to enable a user to submit user queries to locate documents. The server has a data mining mechanism configured to receive the user queries and generate information retrieval sessions. The communications pathway extends between the client and the server. The database is provided in communication with the client and the server. The database stores data in the form of usage logs generated from the information retrieval sessions generated by a user at the client. The data mining mechanism includes a clustering algorithm operative to identify context groups and usage categories. The data mining mechanism is operative to identify query contexts associated with individual queries from the usage logs, partition the queries into context groups having similar contexts, and compute multiple context groups associated with specific query keywords from the usage logs.

According to another aspect, a method is provided for relating user queries and documents using usage logs from retrieval sessions from a text retrieval system. The method includes: identifying contexts associated with a user query comprising at least one specific query keyword; identifying user queries having similar query contexts; partitioning user queries into groups based upon similarity of the query contexts; merging the groups to compute multiple contexts associated with specific query keywords; and applying a clustering algorithm to identify similar query contexts based upon the query keywords to generate context groups that associate keywords with documents accessed by users.

According to yet another aspect, a method is provided for relating user queries and documents using usage logs from retrieval sessions from a text retrieval system. The method includes: identifying contexts associated with a user query comprising at least one specific query keyword; identifying user queries having similar query contexts; partitioning user queries into groups based upon similarity of the query contexts; merging the groups to compute multiple contexts associated with specific query keywords; and applying a clustering algorithm to identify similar query contexts based upon the query keywords to generate context groups that associate keywords with documents accessed by users.

DESCRIPTION OF THE DRAWINGS

Preferred embodiments of the invention are described below with reference to the following accompanying drawings depicting examples embodying the best mode for practicing the invention.

FIG. 1 is a schematic block diagram illustrating a text retrieval system for mining usage logs.

FIG. 2 is an exemplary format for a usage log, in this case a retrieval system log, for the text retrieval system of FIG. 1.

FIG. 3 is an exemplary list of documents that are selectively accessible by a user from a database, and from which usage logs are generated each time a user accesses such documents.

FIG. 4 is an exemplary list of retrieval sessions from a user accessing the list of documents in FIG. 3.

DETAILED DESCRIPTION OF THE INVENTION

Figures 5, 6:
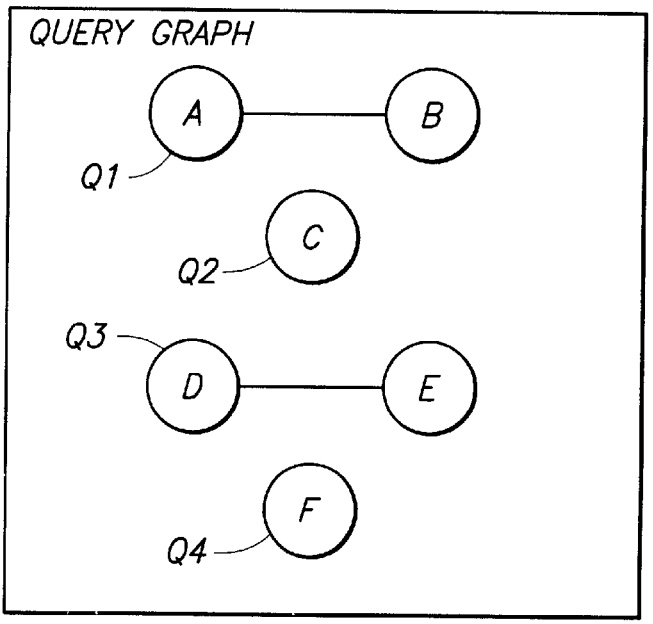
FIG. 5 is an exemplary query graph for the usage log generated by the retrieval sessions of FIG. 4.
FIG. 6 is an exemplary graph of features and one vector for each query context of FIG. 5.

This disclosure of the invention is submitted in furtherance of the constitutional purposes of the U.S. Patent Laws "to promote the progress of science and useful arts". U.S. Constitution, Article 1, Section 8.

An apparatus and method are provided for mining usage logs to discover context groups and document categories when conducting user queries or retrieval sessions. A new text retrieval mechanism is utilized having an infrastructure that uses retrieval system logs organized as retrieval sessions. Keyword associations and document categories are computed from user logs.

Reference will now be made to a preferred embodiment of Applicant's invention. One exemplary implementation is described below and depicted with reference to the drawings comprising a text retrieval mechanism that, in one embodiment, is implemented over a network. While the invention is described via a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

FIG. 1 illustrates a data mining apparatus identified generally by reference numeral 10. According to one construction, apparatus 10 is implemented over a communication pathway 12 within a client/server network environment 14 which include client 16 and server 18. A client/server network environment 14 includes communication pathway 12, which in one form includes a network 20. Also, according to one construction, network 20 is a local area network. Additionally, or optionally, such local area network 20 is provided within the Internet 22. Accordingly, network 20 can also include the Internet 22. According to an even further construction, Internet 22 is the World Wide Web (WWW) 24.

This invention proposes a novel and powerful approach to solving the previously described word mismatch problem incurred with prior art techniques based on historical information. Many systems usually record the user interactions in a log for purposes such as debugging. For example, many systems record user interaction over the world wide web (WWW) in web server logs. Such logs contain valuable information about past user interactions. The ability to gather user experiences, or requests, from these logs is a powerful tool. The gathering of this information is unobtrusive, or is not readily noticeable from the users perspective. User actions are simply recorded, and the user is not required to do anything special. Once these user actions have been recorded in logs, the actions can also be recreated by accessing the logs in order to understand user behavior.

Obviously, information recorded in the logs depends on the functionality of the system and what user and/or system actions are logged, or recorded, in the logs. For a text retrieval system, logs may contain, for each user query, the query itself, the number of documents from the collection that satisfy the query, the documents opened by the user, any feedback information on the relevance of the query, or other similar information. Past user behavior which is recorded in text retrieval system logs can be effectively exploited in order to bridge the gap between the keywords used to express users' problems and the documents that are relevant to the problem. By analyzing the usage, an attempt can be made to understand the intent of the keywords that have been entered by the user based on the documents which were actually read or reviewed by the user.

For example, suppose it is determined by reviewing usage logs that one user submitted the query "pfs" (which stands for portable file system in HP UX), then perused the same set of documents as another user whose query was "cdrom". Then, we may conclude that "pfs" and "cdrom" are synonyms. Another scenario comes about where two users have previously issued identical queries, say, "pfs", but have then gone on to read different documents, as evidenced by each user's usage logs. For example, one user has read documents associated with "pfs" and "mount", and the other user has read documents related to "pfs" and "fail". For this particular example, we can assume that there are at least two different contexts associated with the keyword "pfs".

Applicant's technique implements a "log relationship method" in order to mine (or locate) relationships between queries and/or keywords and documents using the text retrieval system's logs. In particular, for each keyword appearing in the log, the log relationship method identifies the following: a) all keywords it is related to; b) different contexts associated with this keyword; and c) a set of relevant documents for each context associated with this keyword.

The log relationship method described in greater detail below captures and summarizes past user interaction from the logs. Typically user queries tend to focus only on a subset of documents in the corpus at any given time. Therefore, the information mined from the logs is inherently incomplete compared to corpus analysis. On the other hand, logs record valuable information about preferred keywords used to access documents, and the relationship between documents/keywords as perceived by users. Such information cannot be obtained from corpus analysis.

I. Log Relationship Implementation
A. Retrieval System Logs

It is assumed that retrieval system logs will be organized as retrieval sessions. A retrieval session is understood to include all information pertaining to one user query and is represented by the query itself. For purposes of this disclosure, the phrases "user query" and "retrieval session" will be used interchangeably. It will be assumed that a retrieval session contains the query itself, the number of documents found to satisfy the query, and the list of document "ids", or identifiers, retrieved by the user for reading, which we refer to as the list of opened document ids.

FIG. 2 illustrates an exemplary format for a retrieval system log. In FIG. 2, $q_i$s are queries, $n_i$ is the number of documents found in the document collection matching $q_i$, and $d_i$s are opened document ids for the corresponding $q_i$s, where i=1, 2, 3.

It is assumed that the log retrieval system does not contain any relevance feedback information. This is a reasonable assumption because explicit feedback is hard to obtain. However, various heuristics can be used in order to assign a relevance ranking to a document in the logs. It will be assumed that a document is relevant to a particular query if a user opened this document for reading. The length of time this document was read can also be considered in order to decide if it was relevant, if the log records timestamps for each action. The longer the document was left open, the higher is its relevance rank. Also, there exist scenarios where the last document read by a user is most relevant to the query, assuming that the log records the order in which a user opened the documents. Currently, a document is considered to be relevant to a query if the user opens this document for reading.

In practice, a user may submit multiple queries in an attempt to solve the same problem. Subsequent queries may be refinements of the initial query. It is currently assumed that each query is a separate session. This technique can be extended to the case where each retrieval session includes multiple queries, or a user problem rather than a single query.

B. Approach

The computation of contexts associated with specific keywords is a two-step process. In the first step, which is hereafter referred to as the context discovery step, queries having similar context are partitioned into groups. In the next step, which is hereafter referred to as the context merge step, these groups are merged in order to compute multiple contexts associated with query keywords. The following sections illustrate the implementation of the technique.

C. Context Discovery

The retrieval system log is configured to contain user retrieval sessions. Each retrieval session includes the user query that initiated the retrieval session, the number of documents that match the query, and the list of opened document identifiers (ids). Since user queries are typically short, queries cannot be used alone to arrive at the context the user had in mind when they issued the query. This difficulty is furthered by the fact that different keywords may be used in a manner intended to mean the same concept. However, the specific document ids that have been identified as being opened by the user provide valuable information about the intentions of the user at the time they submitted the query.

In order to identify contexts that are associated with a query, clustering techniques are used. Let $O_i$ denote the set of opened document ids associated with query $q_i$. We say that two queries $q_i$ and $q_j$ are related if $O_i \cap O_j \geq k$ where k is specified by the user. In order to group all queries with similar contexts, a query graph G(V,E) is defined. G is an undirected graph with a vertex for each query in the retrieval system log. There is an edge between $q_i$ and $q_j$ if $q_i$ and $q_j$ are related.

For purposes of this disclosure, a "query context" is defined as a set of all the queries that belong to a connected component of G. Also for purposes of this disclosure, a "relevant document set" is defined as being associated with a query context Q, where Q={$q_1$, . . . , $q_p$}, is denoted by rel-doc (Q).

D. Context Merge

The above-described context discovery step is operative to group queries solely based on the corresponding sets of opened document ids. Hence, even though two queries contain the same keywords, they may belong to different contexts. In order to discover multiple contexts of keywords, query contexts are merged if they contain similar keywords. What finally results is a set of context groups where each context group contains one or more query contexts.

Clustering techniques are applied in order to identify similar query contexts. Query contexts are clustered based on keywords. Each query context is first represented as a vector in a high-dimensional space; the clustering algorithm is applied to the vector.

Selecting features: Let $Q_1 \ldots Q_j$ be the query contexts computed by the context discovery step. Let $Q = \cup_{i=1} Q_i$. Let W be the set of all words in Q. Stop words or non-content bearing words such as and, or from W are eliminated. Then the words in W are stemmed in order to reduce words to their common roots. Let the final set of words be W' and let |W'| be m. The words in W' are used as features for the clustering algorithm.

The following conditions are applied when converting query contexts into vectors in m-dimensional space: Let W'={$w_1, \ldots w_m$}. Let $V_i = <v_1, \ldots v_m>$ be the m-dimensional vector representing query context $Q_i$. Let $T_i$ be the total number of words in $Q_i$ (after eliminating stop words). Let $f_l$ be the occurrence frequency of $w_l$ in $Q_i$. Then, $v_p$ ($1 \leq p \leq m$)=$f_p|T_i$. Additionally, $v_p$=0 if $w_p \notin Q_i$.

According to one implementation for a clustering algorithm, a Self-Organizing Map clustering (SOM) algorithm is applied to the vectors. The SOM algorithm orders the input vectors onto a map such that similar vectors lie near, or proximate, each other. The map typically consists of a regular grid of units and each unit is assigned a model vector. Each input vector v is mapped to the unit $u_i$ whose model vector best represents the input vector. For example, the Euclidean distance between the model vector corresponding to $u_i$ and v is the smallest among all units. Then, the model vector of $u_i$ as well as its neighboring units are updated so that the updated model vectors learn to represent the data sample more accurately. Details of the SOM algorithm are described in greater detail with reference to *Self-Organizing Maps*, by T. Kohonen, Springer Series in Information Sciences, Vol. 30, Springer, 1995. Such reference is herein incorporated by reference as indicating details of a SOM algorithm presently understood in the art.

E. Example

FIG. 3 illustrates an exemplary list of documents that are selectively accessible by a user from a database, and from which mining usage logs are generated each time a user accesses such documents.

FIG. 4 illustrates an exemplary list of retrieval sessions from a user accessing the list of documents depicted in FIG. 3.

As was discussed above, k is the number of opened document ids that two queries must have in common in order to be related. For purposes of this example, suppose k=1. The query graph for the resulting usage log is shown in FIG. 5. Based on the query graph, the query contexts can be identified as the following:

Query context $Q_1$: {A,B}.
Query context $Q_2$: {C}.
Query context $Q_3$: {D,E}.
Query context $Q_4$: {F}.

The query contexts are then clustered in order to form context groups.

FIG. 6 shows the features and one vector for each query context $Q_1, \ldots, Q_3$. For this example, when the vectors are clustered, it is assumed that there are two context groups:

Context group $C_1$: $\{Q_1, Q_2, Q_4\}$.
 1. Multiple contexts of "pfs": {{pfs, cdrom}, {pfs, mount, oracle}}.
 2. Multiple contexts of "oracle" and "mount": {{pfs, mount, oracle}, {oracle, mount, fail}}.

Context group $C_2$: $\{Q_3\}$.
 1. A context of "swinstall" and "hang": {swinstall, hang}.

II. Application of Context Groups: Document Categories

In this section, a technique is described for making use of context groups that are discovered from the usage logs. Context groups and query contexts capture the associations among keywords and also with documents accessed by users and are therefore used to compute relevant document categories. One technique for using these context groups is described below.

A. Multi-level Context DAG

Each context group is represented as a directed acyclic graph which is referred to as a "multi-level context DAG". Suppose a context group C contains query contexts $Q_l, \ldots, Q_p$. Let $CBW(Q_i)$ denote the set of content-bearing words in $Q_i$. The multi-level context DAG of C contains a node for each non-empty set of content-bearing words that can be obtained by intersecting CBW sets of one or more query contexts in C. Consequently, there is a node for each $CBW(Q_i)$. There is an edge from node A to B in the DAG if A is a proper subset of B. All the nodes on the DAG corresponding to the query contexts are referred to as "query context nodes". All other nodes are referred to as "general context nodes".

A set of documents is attached to each node in a multi-level context DAG. The document sets associated with query context nodes are the corresponding rel-docs sets from the context discovery steps. The document set associated with a general context node is the union of the document sets associated with each of its children.

A multiple, or multi-level, context DAG captures the context associated with documents, from most general to most specific. The most general context associated with a document may be referred to as a "category". A query context is the most specific content, and hence, query context nodes usually have a smaller set of documents associated with them. As the scope of query contexts is expanded by creating general context nodes, the number of documents may potentially increase.

Figure 7:
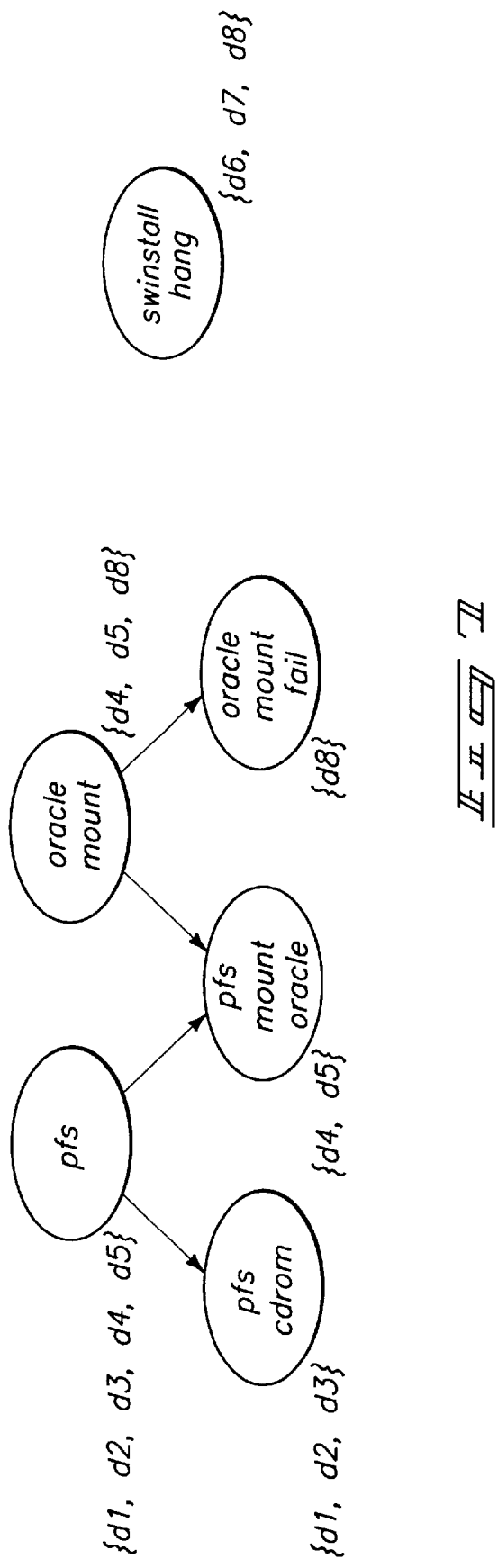
FIG. 7 is a state diagram for a multiple-level context directed acyclic graph (DAG).

Multi-level context DAGs are used in order to enable browsing. As shown in FIG. 7, multi-level DAGs are displayed to a user. When a user clicks on a displayed node, all documents and the keyword set associated with that node are displayed to the user.

III. Conclusions

The above-described one implementation of Applicant's technique provides a new apparatus and method for computing keyword associations and document categories from usage logs. According to prior art techniques, keyword associations were computed primarily based on corpus analysis. The present technique proves significantly better compared to the traditional approach for the following reasons.

First, for large document collections, corpus analysis is very expensive. The log relationship method does not depend on the size of the document collection, and hence is a scalable approach.

Secondly, only a small portion of documents are accessed at any given point of time. The log relationship method focuses only on these documents.

Finally, the most important advantage of the log relationship is that it tries to capture the user's intent and vocabulary by analyzing his/her behavior through the logs. This kind of information can never be collected by corpus analysis.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for relating user queries and documents, comprising:
 a client configured to enable a user to submit user queries to locate documents;
 a server having a data mining mechanism configured to receive the user queries and generate information retrieval sessions;
 a communications pathway extending between the client and the server; and
 a database provided in communication with the client and the server, the database storing data in the form of usage logs generated from the information retrieval sessions generated by a user at the client; wherein the data mining mechanism includes a clustering algorithm identifying context groups and usage categories, and operative to identify query contexts associated with individual queries from the usage logs, partition the queries into context groups having similar contexts, and compute multiple context groups associated with specific query keywords from the usage logs.

2. The apparatus of claim 1 wherein each query context comprises a set of all queries that belong to a connected component of G, wherein G is an undirected query graph with a vertex for each query in a usage log.

3. The apparatus of claim 1 wherein individual context groups comprise one or more query contexts, wherein queries are grouped solely based on corresponding sets of opened document ids, with a query comprising at least one keyword.

4. The apparatus of claim 1 wherein the clustering algorithm clusters together query contexts to form the context groups.

5. The apparatus of claim 1 wherein each context group is represented as a directed acyclic graph (DAG) comprising a multi-level context DAG having at least one query context node and at least one general context node.

6. The apparatus of claim 5 wherein individual documents are attached to individual nodes of the multi-level context DAG.

7. The apparatus of claim 6 wherein a relevant document set, rel-doc (Q), that is associated with a query context, Q, comprises a group of individual documents attached to a query context node.

8. The apparatus of claim 1 wherein individual queries are grouped based on corresponding sets of opened document ids from the usage logs.

9. The apparatus of claim 1 wherein each query is an individual user retrieval session.

10. A method for relating user queries and documents using usage logs from retrieval sessions from a text retrieval system, comprising:
    identifying contexts associated with a user query comprising at least one specific query keyword;
    identifying user queries having similar query contexts;
    partitioning user queries into groups based upon similarity of the query contexts;
    merging the groups to compute multiple contexts associated with specific query keywords; and
    applying a clustering algorithm to identify similar query contexts based upon the query keywords to generate context groups that associate keywords with documents accessed by users.

11. The method claim 10 wherein each query context is identified as a vector.

12. The method of claim 11 wherein the clustering algorithm comprises a self-organizing map (SOM) clustering algorithm configured to order the vectors onto a map such that similar vectors lie proximate each other.

13. The method of claim 11 wherein the map comprises a regular grid of units, with each unit being assigned a model vector, wherein each vector is mapped to the unit whose model vector best represents the input vector.

14. The method of claim 10 wherein the step of partitioning comprises representing each context group as a directed acyclic graph, with each context group containing query contexts.

15. The method of claim 14 wherein the acyclic graph comprises a multi-level context directed acyclic graph (DAG).

16. A method for associating user queries in the form of keywords and documents accessed from usage logs in response to submission of the user queries during user retrieval sessions from a text retrieval system, comprising:
    identifying contexts associated with a user query comprising at least one specific query keyword;
    identifying similar query contexts from individual user queries;
    partitioning the user queries into groups based upon the identified similar query contexts;
    associating the groups to identify at least one query context associated with each specific query keyword;
    clustering similar query contexts based upon the query keywords to generate context groups that associate the keywords with documents accessed by users; and
    graphically depicting the contexts associated with documents from most general to most specific.

17. The method of claim 16 wherein multi-level context directed acyclic graphs (DAGs) are used to display to a user the contexts associated with individual documents.

18. The method of claim 16 wherein the step of graphically depicting the contexts comprises displaying a multi-level context directed acyclic graph (DAG) to a user via a graphical user interface.

19. The method of claim 18 wherein the displayed DAG comprises query context nodes and general context nodes.

20. The method of claim 19 wherein the query context nodes identify a document set comprising a relevant document set, rel-doc (Q), associated with a query context, Q, where the query context is a set of all the queries that belong to a connected component of a query graph, G.

21. An apparatus for relating user queries and documents, comprising:
    a client configured to enable a user to submit user queries to locate documents;
    a server having a data mining mechanism configured to receive the user queries and generate information retrieval sessions;
    a communications pathway extending between the client and the server; and
    a database provided in communication with the client and the server, the database storing data in the form of usage logs generated from the information retrieval sessions generated by a user at the client,
    wherein the data mining mechanism includes a clustering algorithm identifying context groups and usage categories, and operative to identify query contexts associated with individual queries from the usage logs, partition the queries into context groups having similar contexts, and compute multiple context groups associated with specific query keywords from the usage logs,
    and wherein each query context comprises a set of all queries that belong to a connected component of G, wherein G is an undirected query graph with a vertex for each query in a usage log.

22. An apparatus for relating user queries and documents, comprising:
    a client configured to enable a user to submit user queries to locate documents;
    a server having a data mining mechanism configured to receive the user queries and generate information retrieval sessions;
    a communications pathway extending between the client and the server; and
    a database provided in communication with the client and the server, the database storing data in the form of usage logs generated from the information retrieval sessions generated by a user at the client,
    wherein the data mining mechanism includes a clustering algorithm identifying context groups and usage categories, and operative to identify query contexts associated with individual queries from the usage logs, partition the queries into context groups having similar contexts, and compute multiple context groups associated with specific query keywords from the usage logs,
    and wherein individual context groups comprise one or more query contexts, wherein queries are grouped solely based on corresponding sets of opened document IDs, with a query comprising at least one keyword.

23. An apparatus for relating user queries and documents, comprising:
    a client configured to enable a user to submit user queries to locate documents;
    a server having a data mining mechanism configured to receive the user queries and generate information retrieval sessions;

a communications pathway extending between the client and the server; and a database provided in communication with the client and the server, the database storing data in the form of usage logs generated from the information retrieval sessions generated by a user at the client, wherein the data mining mechanism includes a clustering algorithm identifying context groups and usage categories, and operative to identify query contexts associated with individual queries from the usage logs, partition the queries into context groups having similar contexts, and compute multiple context groups associated with specific query keywords from the usage logs, and wherein each context group is represented as a directed acyclic graph (DAG) comprising a multi-level context DAG having at least one query context node and at least one general context node.

24. The apparatus of claim 23 wherein individual documents are attached to individual nodes of the multi-level context DAG.

25. The apparatus of claim 24 wherein a relevant document set, rel-doc (Q), that is associated with a query context, Q, comprises a group of individual documents attached to a query context node.

26. An apparatus for relating user queries and documents, comprising:

a client configured to enable a user to submit user queries to locate documents;

a server having a data mining mechanism configured to receive the user queries and generate information retrieval sessions;

a communications pathway extending between the client and the server; and a database provided in communication with the client and the server, the database storing data in the form of usage logs generated from the information retrieval sessions generated by a user at the client, wherein the data mining mechanism includes a clustering algorithm identifying context groups and usage categories, and operative to identify query contexts associated with individual queries from the usage logs, partition the queries into context groups having similar contexts, and compute multiple context groups associated with specific query keywords from the usage logs, and wherein individual queries are grouped based on corresponding sets of opened document IDs from the usage logs.

27. A method for relating user queries and documents using usage logs from retrieval sessions from a text retrieval system, comprising:

identifying contexts associated with a user query comprising at least one specific query keyword;

identifying user queries having similar query contexts;

partitioning user queries into groups based upon similarity of the query contexts;

merging the groups to compute multiple contexts associated with specific query keywords; and applying a clustering algorithm to identify similar query contexts based upon the query keywords to generate context groups that associate keywords with documents accessed by users, wherein each query context is identified as a vector.

28. The method of claim 27 wherein the clustering algorithm comprises a self-organizing map (SOM) clustering algorithm configured to order the vectors onto a map such that similar vectors lie proximate each other.

29. The method of claim 27 wherein the map comprises a regular grid of units, with each unit being assigned a model vector, wherein each vector is mapped to the unit whose model vector best represents the input vector.

30. A method for relating user queries and documents using usage logs from retrieval sessions from a text retrieval system, comprising:

identifying contexts associated with a user query comprising at least one specific query keyword;

identifying user queries having similar query contexts;

partitioning user queries into groups based upon similarity of the query contexts;

merging the groups to compute multiple contexts associated with specific query keywords; and applying a clustering algorithm to identify similar query contexts based upon the query keywords to generate context groups that associate keywords with documents accessed by users, wherein the step of partitioning comprises representing each context group as a directed acyclic graph, with each context group containing query contexts.

31. The method of claim 30 wherein the acyclic graph comprises a multi-level context directed acyclic graph (DAG).

* * * * *